May 23, 1967   C. C. SEGER   3,321,173
LOW FLOW VALVE
Filed Feb. 27, 1964
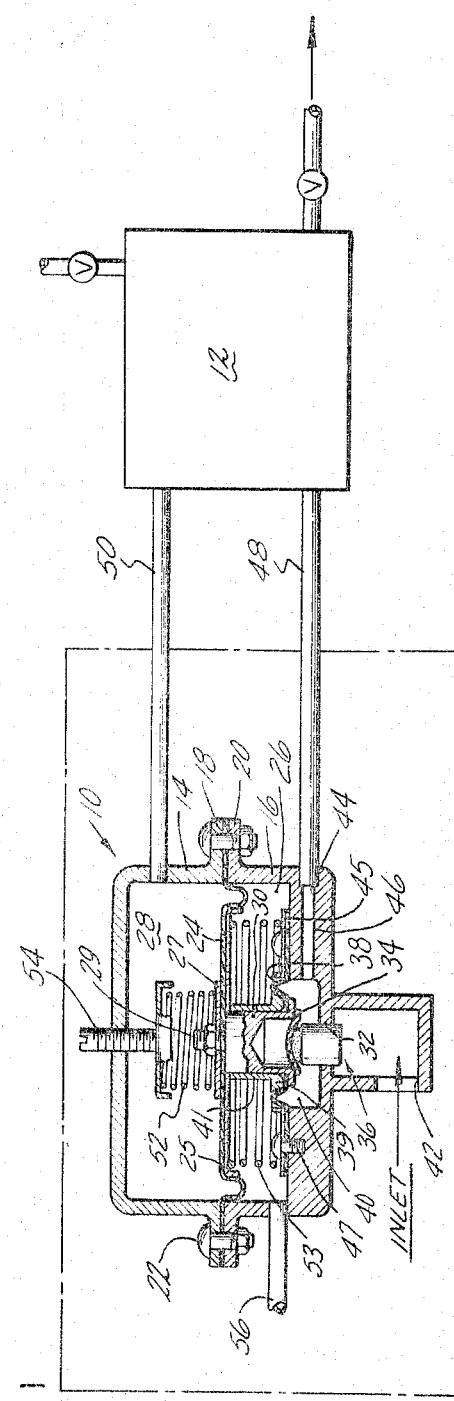
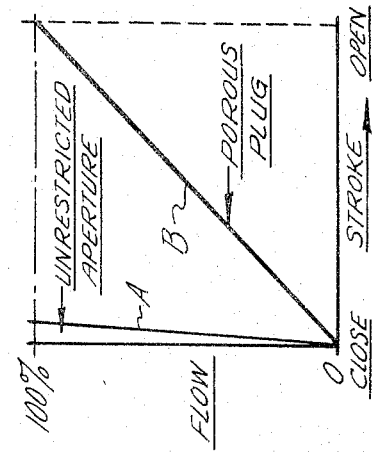
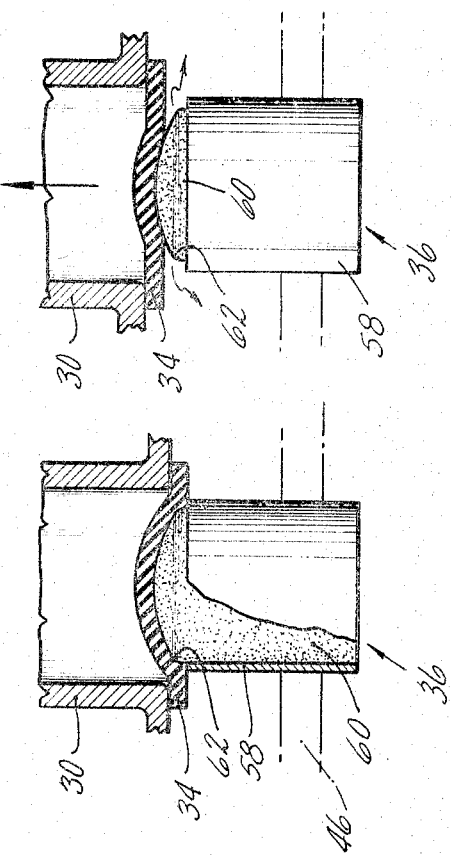
INVENTOR
CHARLES C. SEGER
BY Norman Friedland
ATTORNEY 3,321,173
LOW FLOW VALVE
Charles C. Seger, Windsor Locks, Conn., assignor to United Aircraft Corporation, East Hartford, Conn., a corporation of Delaware
Filed Feb. 27, 1964, Ser. No. 347,798
3 Claims. (Cl. 251—61)

This invention relates to valves and particularly to valves for metering fluid at extremely small volumes at minute flows.

In certain applications particularly where it is desirable to regulate pressure for small volumes having small gas flow, a problem has occurred in using conventional valves, that on opening said valves a relatively large volume of flow is immediately metered which has a tendency to increase the value of the pressure beyond the preselected regulated value. In these applications where the volume of gas being regulated is retained in a chamber or container having a relief valve which is set close to the pressure which is being regulated by the pressure regulator, the large volume of flow created by cracking the valve open could inadvertently cause the relief valve to open. Such a condition is extremely undesirable and intolerable particularly where the gas is needed to sustain life.

To obviate this problem I have found that I can obtain a minute volume of flow and a minute rate of flow by inserting in an orifice a porous plug and making the cooperating poppet of such flexible and resilient material that in the closed position the material will deform to closely hug the outer metering surface of the porous plug.

It will also be realized that in certain applications where the flow requirements are extremely small, the size of the aperture handling the flow must likewise be made small, but it is difficult and in some instances even impossible to make the aperture small enough to meet these flow requirements. In such instances this invention lends itself to this situation since the aperture can be made significantly large and a porous plug inserted in the enlarged aperture would meet the small flow requirements.

It is therefore an object of this invention to provide for a metering device as described, a porous plug and a cooperating flexible poppet member.

A still further object of this invention is to provide a metering device as described which is characterized as being relatively simple to manufacture, economical to build, highly reliable and yet capable of rugged use.

Other features and advantages will be apparent from the specification and claims and from the accompanying drawings which illustrate an embodiment of the invention.

FIG. 1 is a partial schematic and sectional view of a suitable pressure regulator employing this invention.

FIG. 2 is an enlarged fragmentary sectional view showing the cooperation between the poppet and the porous plug when in the closed position.

FIG. 3 is an enlarged fragmentary view showing the cooperation between the porous plug and poppet in a partially opened position.

FIG. 4 is a graphic illustration showing the stroke required by the porous plug and a conventional type of valve.

Referring now particularly to FIG. 4 which graphically illustrates the difference between a conventional type of valve and one employing this invention, wherein line A illustrates a conventional type valve and line B illustrates the present invention. As is apparent from FIG. 4 from the closed position to full open position for obtaining 100 percent designed flow, the stroke necessary is relatively small (line A) in comparison with the stroke illustrated by line B. Hence, it is apparent that for the same flow requirements, line B shows that a larger stroke is necessary to achieve the desired 100 percent flow.

The incorporation of this invention has the effect of making the device less sensitive to flow changes. That is to say, that a larger stroke is required to obtain a larger amount of flow in the porous plug device so that a greater amount of control is obtained during the low flow regimes. As for example, a poppet movement of .00125 inch would fully open a metering valve having a .005 inch diameter orifice in a conventional type of valve. In the present device a .06 inch stroke could be obtained for a porous plug metering valve having an area equivalent to the .005 inch diameter orifice size.

Now referring to FIGS. 1, 2 and 3 which generally illustrate a pressure regulating valve generally indicated by the numeral 10 which serves to maintain the pressure in chamber 12 at a constant value. Pressure regulating valve 10 may comprise an upper casing member 14 and a lower casing member 16 each of which have radially extending flanges 18 and 20 respectively, which complement each other and are secured to each other by suitable securing means illustrated by member 22. Interposed between the flanges and sandwiched between ring members 25 and 27 is diaphragm 24 which defines two sub-chambers 26 and 28. Threaded extension 29 on valve stem 30 projects beyond ring member 27 and the ring members and diaphragm are secured by the engaging nut. A resilient flexible poppet member 34 is suitably mounted on the bottom of stem 30 and is positioned to engage the porous plug generally indicated by numeral 36. Porous plug 36 may be press fitted into opening 32.

Diaphragm 38 which is secured to the outer peripheral surface of stem 30 and held in position by flange 39 on sleeve 41 and flange 43 extending radially from stem 30 and to the inner bottom wall of chamber 26 defines chamber 40. The diaphragm may be supported by plate member 45 which overlies the outer circumferences of diaphragm 38 and held in place by a plurality of bolts 47 threadably secured to the casing 16. Porous plug 36 interposed between inlet 42 and outlet 44 formed in lower casing 16, meters fluid to chamber 12 through the drilled passage 46 and line 48. It will be noted that the pressure in chamber 12 is sensed by interconnection made by passage 50 which connects chamber 28. Spring 52 disposed in chamber 28 acts against diaphragm 24 to urge it downwardly and spring 53 acts on the other end of diaphragm 24 to urge it upwardly. The height of spring 52 can be preset by the adjusting mechanism 54.

As is apparent from the foregoing, the value of the pressure regulated by pressure regulator 10 is determined by the relative forces of springs 52 and 53, the areas of diaphragms 38 and 28, the referenced pressure fed into chamber 26 through line 56 and the pressures in chambers 28 and 40. Hence, by sensing the pressure in chambers 40 and 28, the pressure regulator valve 10 will maintain the pressure in chamber 12 at a constant predetermined value. The pressure to be regulated in chamber 12 is sensed in chambers 28 and 40 and if the pressure is low, diaphragm 24 will be forced upwardly by spring 53 raising stem 30, unseating poppet 34 and thus allowing flow into the regulator chamber 12 via line 48. As flow goes into chamber 12, pressure builds up. The increased pressure is sensed in chambers 40 and 28 increasing the downward force pushing valve stem 30 downwardly thus reducing the gas flow into chamber 12. The use of a resilient flexible type of poppet allows the gas flow to be shut off completely once the pressure requirements are satisfied.

The structure of the poppet is more clearly illustrated by referring to FIGS. 2 and 3. The poppet may contain an outer shell 58 which circumscribes a porous plug 60 which may be suitably made from any well-known sintered metallic or ceramic material. The top of porous plug 60 may be contoured to take the shape of a partially spherical body 62. The poppet 34 is preferably made out of a synthetic or rubber flexible and resilient material which will deform to take the shape to define a complementary surface for overlying the top surface of the body 62 of the plug. This will assure no flow in the full closed position. Of course, the particular shape of the plug will be determined by the particular flow requirements desired.

It may be desirable to make stem 30 and the flexible resilient poppet 34 from a unitary member bearing in mind that the only requirement for the poppet is that it will deform sufficiently to properly seal the porous member in the closed position.

As noted, FIG. 2 shows the plug being completely sealed by urging stem 30 downwardly with sufficient force to completely overlie the top surface 62 of plug 60.

FIG. 3 illustrates the relative position between the poppet and the plug to show a partially open position.

What has been shown by this invention is a valve which is capable of obtaining relatively low volumes having small gas flows which valve is capable of increasing the stroke of the conventional type valves. The increased stroke enables the valve to exhibit a larger degree of accuracy and control for minute flow valves. By virtue of the fact that the porous plug allows the metering orifice to be substantially larger than that of an unporous type of orifice, the susceptibility of becoming inoperative because of clogging is less likely.

It should be understood that the invention is not limited to the particular embodiments shown and described herein, but that various changes and modifications may be made without departing from the spirit or scope of this novel concept as defined by the following claims.

I claim:
1. For a fluid metering device adapted to meter small quantities of flow, comprising a hollow valve housing, a diaphragm supported in said housing, a closure element having a sleeve secured to said diaphragm and extending toward an opening formed in said housing, an element made from a flexible and resilient material secured to and movable with said sleeve, a porous plug inserted in said opening and projecting into said hollow valve housing, a nonporous surface surrounding the outer periphery of said plug, said porous plug allowing fluid to flow axially from the bottom surface to the top surface of said plug and means for imparting movement to said sleeve so as to permit said resilient material to engage the top surface of said plug which is projecting into said hollow valve housing to progressively deform about said top surface to encircle the same so as to progressively block off the pores of said plug to permit a small flow for a relatively large displacement of said sleeve.

2. A valve construction as defined in claim 1 wherein said diaphragm subdivides said housing into a pair of chambers, means for leading fluid in said chambers to act on said diaphragm to urge it to and away from said porous plug.

3. A valve construction as defined in claim 2 including adjustable spring disposed in one of said chambers and having one end bearing on said diaphragm.

References Cited by the Examiner
UNITED STATES PATENTS

| | | | |
|---|---|---|---|
| 2,908,290 | 10/1959 | Peters | 251—118 |
| 2,948,296 | 8/1960 | Thorburn | 137—517 |
| 3,076,475 | 2/1963 | Singer | 137—505.23 |

WILLIAM F. O'DEA, *Primary Examiner.*

HOWARD M. COHN, *Assistant Examiner.*